…

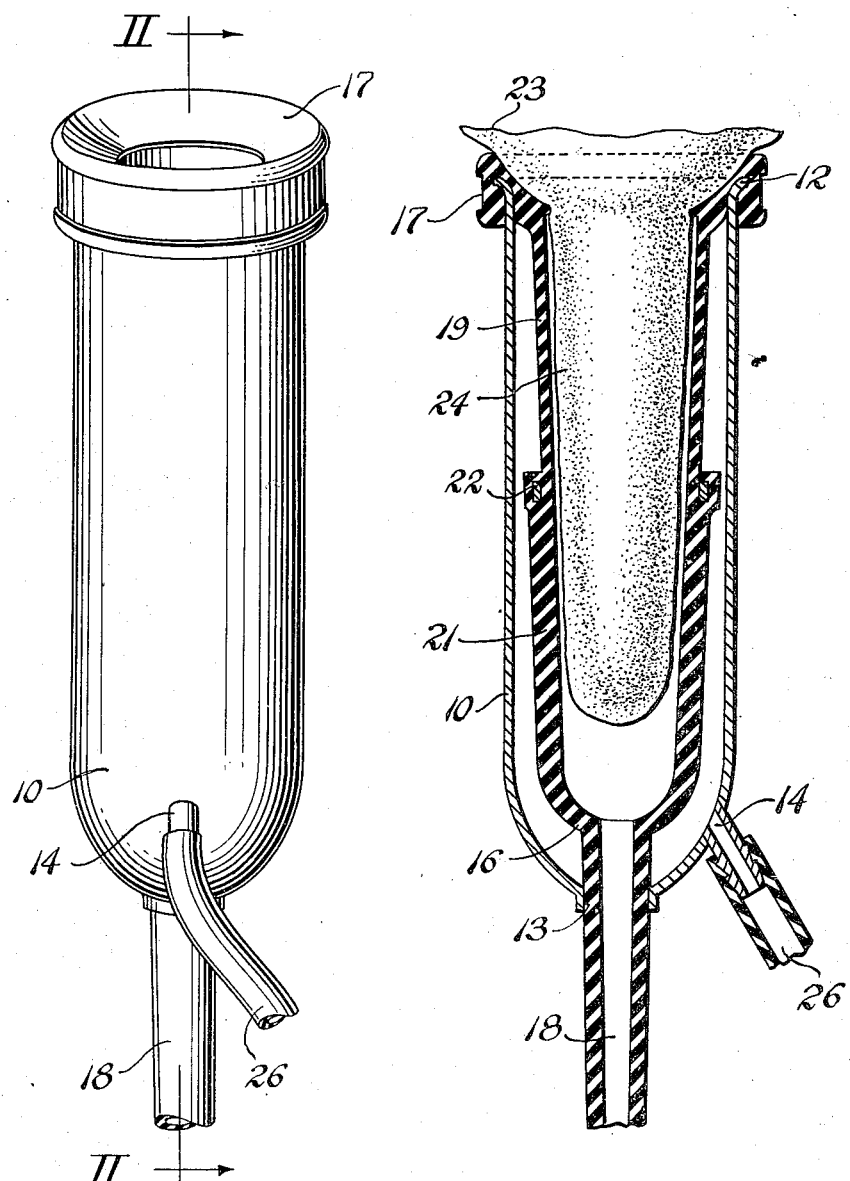

UNITED STATES PATENT OFFICE 2,541,988

INFLATOR

Worth A. Cyphers, Morrow County, Ohio

Application March 17, 1949, Serial No. 81,915

4 Claims. (Cl. 31—85)

This invention relates to milking machines and more particularly relates to an inflator for teat cups of milking machines.

An object of this invention is to provide an inflator which squeezes or compresses the upper part of a teat but does not constrict the central portion of the teat.

A further object of this invention is to provide an inflator which squeezes the upper portion of a teat with greater force than the lower portion.

A further object of this invention is to provide an inflator which progressively squeezes or compresses the teat from the upper part to the lower part.

A further object of this invention is to provide an inflator which constricts upper and lower portions of a teat but which does not constrict the central portion of the teat.

A further object of this invention is to provide an inflator for a teat cup which reproduces as closely as possible the action of hand milking.

A further object of the invention is to provide an inflator which is so designed that it applies pressure to the teat that commences at the upper part of the teat and progresses uniformly towards the tip of the teat without constricting the teat at any intermediate point.

A still further object of the invention is to provide an inflator having a rigidified middle section and flexible portions above and below the same so that when the inflator squeezes the teat of a cow the teat will not be constricted sufficiently to interfere with the flow of milk or cause the milk to be forced back into the udder.

The above and other objects and features of the invention will in part be obvious and will in part be apparent from the following detailed description taken in conjunction with the accompanying drawing, in which:

Figure 1 is a view in side elevation showing a teat cup and inflator constructed in accordance with an embodiment of this invention; and Fig. 2 is a view in section taken along a line II—II in Fig. 1.

As shown in the drawing, a shell or teat cup is indicated at 10. Shell 10 is of usual shape being generally cylindrical and having a large opening 12 at the top and a smaller opening 13 at the bottom. A side suction connection 14 at the lower end of the shell communicates with the interior.

An inflator 16 is disposed within the shell or teat cup 10. The inflator 16 is tubular in shape and is formed of rubber or other rubber-like material of any appropriate suitable type. As indicated at 17 the upper end of the inflator is quite heavy or thick and is molded to receive the upper end of the shell. The lower end of the inflator terminates in a milk and suction tube 18 which extends through the opening in the lower end of the teat cup. During milking, suction is impressed upon the milk and suction tube 18 in the usual manner to remove milk to the collector or pail not shown.

The inflator 16 comprises two sections or portions 19 and 21 which are separated by a rigidified section 22. Section 19 which lies between the upper end 17 of the inflator and section 22, is relatively flexible and pliable, while the lower section 21 is relatively more rigid and less pliable than section 19, as indicated by the difference in the wall thicknesses thereof. The rigidified section 22 is designed to resist collapse when suction is applied to tube 18. This section may be rigidified in various ways as by reinforcing it with a metal ring embedded in the wall of the inflator at the location shown in the drawing. The location of the rigidified section 22 is preferably such that it lies about at the middle of the teat when properly inserted in the inflator.

The upper end 17 of the teat cup may fit against a cow's udder 23 to form a vacuum-tight seal therewith, while a teat 24 may extend through the body portion of the inflator in the usual fashion during milking, the lower tip of the teat extending beyond the rigidified section 22. Milking is accomplished by providing a vacuum at the end of the cow's teat. The apparatus used with my teat cup and inflator may be conventional. A vacuum is furnished by a pump. The milk receiving tube 18 is connected to a milk receptacle which is so connected to the pump that a constant pressure less than atmospheric is maintained therein and within the inflator 16. A pulsating rarified air condition is provided in the metal cup 10 by means of a side suction tube 26 connected to the side suction connection 14. The suction in the tube 26 is made intermittent by means of an appropriate pulsator piston or the like. The substantially uniform rarified air condition is provided by way of the milk tube 18 and serves the additional purpose or function of retaining the milking apparatus in sealed contact with the udder. Milk is discharged to a receiver through the suction tube 18. When the vacuum in the tube 26 is relieved, the walls of the body portion of the inflator squeezes the teat, and because of the relative thinness of the walls of the upper portion, greater pressure is applied to the upper portion of the teat than to the lower portion and the pressure is applied earlier in the suction impulse to the upper portion of the teat than to the lower portion or tip thereof. However, the walls of the lower body portion are sufficiently thin so that they will apply sufficient pressure to strip milk from the lower portion of the teat. The stiff ring 22 prevents the central portion of the teat from constricting the teat. As a result, the inflator of this invention provides a milking action in which pressure is applied to the upper portion of the teat to a greater extent than to the lower portion and in which the upper portion and lower portion are squeezed in sequence so that the action substantially approximates the action of best hand milking practices.

The embodiment of the invention described above and illustrated in the drawing may be modified and changed in various structural details without departing either from the spirit or scope of the invention as set forth in the appended claims.

Having described my invention, what I claim as novel and desire to secure by Letters Patent is:

1. In combination, an elongated tubular teat cup having open upper and lower ends and a side suction connection communicating with the interior of the teat cup, and a one-piece tubular inflator having upper and lower openings, said inflator being formed of rubber-like material and comprising an annular cap portion embracing edges of the teat cup upper end and adapted to fit against an udder about a teat in air sealed relation with the udder, a milk and suction tube fitting through the lower end of the teat cup in air sealed relation therewith, and a body portion extending between the cap portion and the suction tube and adapted to fit about the teat, said body portion having an upper section having relatively thin flexible walls adapted to engage and constrict the upper portion of the teat, a lower section having relatively thick less flexible walls adapted to engage and constrict the lower portion of the teat, and a rigidified section between the upper and lower sections, the rigidified section resisting deflection when suction is applied to said inflator, the inner surface of the inflator being straight when in relaxed position, whereby when suction is impressed on the milk and suction tube and a pulsating suction is imposed on the side suction connection, the upper portion and the lower portion of the teat are constricted in order and the upper portion is constricted to a greater degree than the lower portion when the suction on the side suction connection is released, and the teat is released when the suction pulse is impressed on the side suction connection, the rigidified section preventing collapse of the inflator opposite the central portion of the teat.

2. An inflator for a milking machine adapted to be housed in a teat cup, said inflator comprising upper and lower sections made of rubber-like flexible material, and a rigidified section between the upper and lower sections, the inner surface of the inflator being straight when in relaxed position, the rigidified section resisting deflection when suction is applied to said inflator, said inflator being adapted to receive a teat with the rigidified section substantially opposite the central portion of the teat.

3. An inflator for milking machines of the type adapted to be received in a teat cup or shell, said inflator being of flexible rubber-like material and comprising an upper and a lower section and an intermediate connecting section, the inner surface of the inflator being straight when in relaxed position, the walls of said upper section being relatively thin, the walls of the lower section being thicker than the walls of the upper section, said intermediate section having a relatively stiff non-flexing element disposed to resist collapse of the inflator at its middle section when suction is applied thereto, said inflator being adapted to receive a teat with the rigidified section substantially opposite the central portion of the teat.

4. A tubular inflator for a teat cup having upper and lower openings, said inflator being formed of rubber-like material and comprising an annular cap portion adapted to embrace edges of the teat cup upper opening and to fit against an udder about a teat in air sealed relation with the udder, a milk and suction tube adapted to fit through the lower opening of the teat cup and a body portion extending between the cap portion and the suction tube and adapted to receive the teat, said body portion comprising an upper section having a relatively thin flexible wall adapted to engage and constrict the upper portion of the teat, a lower section having a relatively thicker less flexible wall adapted to engage and constrict the lower portion of the teat, and a stiff ring between the upper and lower sections to prevent constriction of a central portion of the teat, the inner surface of the inflator being straight when in relaxed position, whereby when a greater suction is impressed on the interior of the inflator than on the exterior, the upper and lower sections of the inflator are adapted to constrict upper and lower portions of the teat in sequence and the stiff ring prevents constriction of the central portion of the teat.

WORTH A. CYPHERS.

REFERENCES CITED

The following references are of record in the file of this patent:

UNITED STATES PATENTS

| Number | Name | Date |
|---|---|---|
| 948,608 | Hodge et al. | Feb. 8, 1910 |
| 950,145 | Schafer | Feb. 22, 1910 |
| 1,252,860 | Terry et al. | Jan. 8, 1918 |
| 1,285,079 | Eklundh et al. | Nov. 19, 1918 |
| 1,308,082 | Kock et al. | July 1, 1919 |
| 1,945,386 | Stampen | Jan. 30, 1934 |
| 2,320,229 | Frost | May 25, 1943 |

FOREIGN PATENTS

| Number | Country | Date |
|---|---|---|
| 60,948 | Germany | Feb. 27, 1892 |
| 567,573 | Germany | Jan. 5, 1933 |